(12) United States Patent
Darnell et al.

(10) Patent No.: US 10,208,689 B2
(45) Date of Patent: Feb. 19, 2019

(54) ADAPTIVE CONTROL OF MOTOR VEHICLE POWERTRAIN

(71) Applicant: Jaguar Land Rover Limited, Whitley, Coventry, Warwickshire (GB)

(72) Inventors: Paul Darnell, Royal Leamington Spa (GB); Elliot Hemes, Solihull (GB); Stephen Stacey, Mansfield (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 56 days.

(21) Appl. No.: 15/389,120

(22) Filed: Dec. 22, 2016

(65) Prior Publication Data

US 2017/0101951 A1 Apr. 13, 2017

Related U.S. Application Data

(63) Continuation of application No. 14/374,395, filed as application No. PCT/EP2013/051441 on Jan. 25, 2013, now Pat. No. 9,528,449.

(30) Foreign Application Priority Data

Jan. 25, 2012 (GB) .................................. 1201202.7

(51) Int. Cl.
*B60W 20/00* (2016.01)
*B60W 10/04* (2006.01)
(Continued)

(52) U.S. Cl.
CPC .............. *F02D 41/04* (2013.01); *B60K 26/04* (2013.01); *B60W 50/10* (2013.01); *F02D 28/00* (2013.01); *B60K 2026/046* (2013.01); *B60W 2050/0026* (2013.01); *B60W 2050/0042* (2013.01); *B60W 2050/0096* (2013.01); *B60W 2510/0657* (2013.01); *B60W 2510/105* (2013.01); *B60W 2520/30* (2013.01); *B60W 2540/10* (2013.01);
(Continued)

(58) Field of Classification Search
None
See application file for complete search history.

(56) References Cited

U.S. PATENT DOCUMENTS 5,961,420 A * 10/1999 Darnell ............... F16H 61/0213
477/115
6,377,884 B1 4/2002 Loeffler et al.
(Continued)

FOREIGN PATENT DOCUMENTS

FR 2962096 A1 1/2012
JP H05321729 A 12/1993
(Continued)

OTHER PUBLICATIONS

Combined Search and Examination Report for application No. GB1201202.7, dated May 25, 2012, 5 pages.
(Continued)

*Primary Examiner* — Adam D Tissot
(74) *Attorney, Agent, or Firm* — Reising Ethington P.C.

(57) ABSTRACT

A method and system for blending between different torque maps of a vehicle in a smooth and progressive manner. Blending is delayed if the vehicle driver cannot detect that blending is taking place, for example, when the difference between a source map and target map is below a predetermined threshold.

18 Claims, 4 Drawing Sheets

(51) Int. Cl.
    *F02D 17/02*     (2006.01)
    *F02D 41/04*     (2006.01)
    *B60W 50/10*     (2012.01)
    *B60K 26/04*     (2006.01)
    *F02D 28/00*     (2006.01)
    *B60W 50/00*     (2006.01)

(52) U.S. Cl.
    CPC .............. *B60W 2710/0605* (2013.01); *B60W 2710/0666* (2013.01); *B60W 2710/105* (2013.01); *B60W 2720/30* (2013.01); *F02D 2200/1002* (2013.01); *F02D 2200/602* (2013.01)

(56) References Cited

U.S. PATENT DOCUMENTS

| | | | |
|---|---|---|---|
| 9,528,449 B2 | 12/2016 | Darnell et al. | |
| 2008/0114521 A1* | 5/2008 | Doering | B60W 30/16 701/96 |
| 2009/0192014 A1 | 7/2009 | Tiwari et al. | |
| 2009/0192692 A1 | 7/2009 | Hartmann et al. | |
| 2009/0299559 A1 | 12/2009 | Shimohira et al. | |
| 2011/0032075 A1 | 2/2011 | Alrabady et al. | |

FOREIGN PATENT DOCUMENTS

| | | |
|---|---|---|
| JP | 2002533255 A | 10/2002 |
| JP | 2007091073 A | 4/2007 |
| JP | 2012091619 A | 5/2012 |
| WO | WO9727388 A | 7/1997 |

OTHER PUBLICATIONS

International Search Report for application No. PCT/EP2013/051441, dated May 7, 2013, 3 pages.

Japanese Office action with English summary corresponding to JP application No. 2014-553731, dated Nov. 10, 2015, 8 pages.

* cited by examiner

ADAPTIVE CONTROL OF MOTOR VEHICLE POWERTRAIN

FIELD OF THE INVENTION

Embodiments of the present invention relate to adaptive control of a powertrain of a motor vehicle. In particular, embodiments of the present invention relate to adaptive control of a source of motive power, for example an internal combustion engine, and in particular, but not exclusively, to the response of the engine to an operator command in consequence of a change of engine operating mode. The change of engine operating mode may in turn be related to a change of operating mode of a vehicle in which the engine is installed. Aspects of the invention relate to a system, to a method and to a vehicle.

BACKGROUND

Internal combustion engines of vehicles may have operating modes which may be selectable by the driver. Thus in some vehicles an economy mode, a normal mode and a sport mode may be provided, each mode having a different engine response to one or more commands of the driver. Typically the engine may respond differently in each mode to a given input of the accelerator pedal, being least responsive in economy mode, and most responsive in sport mode. In this way driveability of the vehicle can be improved by providing a range of accelerator pedal movement which is appropriate to, for example, the desired output torque characteristic of the engine. Such a system necessarily relies upon an electronic input from the vehicle driver, for example an accelerator potentiometer providing an input signal to an electronic control unit having a plurality of accelerator positions/output torque maps.

Another kind of operating mode relates to the terrain which a vehicle is intended to cross. U.S. Pat. No. 7,349,776, the content of which is hereby incorporated by reference, describes a vehicle control system in which the driver can implement improved control over a broad range of driving conditions, and in particular over a number of different terrains which may be encountered when driving off-road. In response to a driver input command relating to the terrain, the vehicle control system is selected to operate in one of a number of different driving modes including one or more terrain response (TR) modes. For each TR mode, the various vehicle subsystems are operated in a manner appropriate to the corresponding terrain.

In one arrangement, a mode (for example a winter mode) is available in which the vehicle is configured to launch from standstill in a forward gear other than first gear such as a second gear to reduce risk of excessive wheel slip. Different modes may have different accelerator pedal maps (amount of engine torque developed for a given accelerator pedal position), torque delivery (accelerator pedal maps in combination with a rate at which engagement of transmission clutches is controlled to take place thereby determining how aggressively gear shifts take place), and transmission shift points as a function of coefficient of surface friction. For example, in one or more TR modes the transmission shift points may be arranged wherein gear shifts take place at lower speeds than they might otherwise take place at, and in a more gentle manner (e.g. at a slower rate).

Thus one or more accelerator/torque maps appropriate to the terrain may be selectable by the driver. For example when driving in rocky terrain, a high torque output may be indicated for a small accelerator movement, thus giving immediate urge to overcome a rock step. In contrast on sand, a low torque output may be indicated for the same accelerator movement, so as to avoid spinning the vehicle wheels and digging a hole. To some extent the selected torque map may be a matter of judgment related to the available grip on the terrain.

The two extreme torque maps associated with any vehicle operating mode coincide at zero accelerator position/zero torque and maximum accelerator position/maximum torque. In between these conditions, a change of map from one (a 'source' map) to another (a 'target' map) causes an immediate change of engine output torque which may be disconcerting to the vehicle driver, especially if the accelerator pedal is not being moved at the time of change.

If an alternative operating mode is selected by the vehicle driver, a change in the characteristic of engine response is generally not a surprise—the change is in fact expected by the driver and is generally desirable. However difficulties may arise if the operating mode is automatically selected in response to a vehicle sensing a change of operating condition. Thus, for example a vehicle may detect a change of terrain from rock to sand and, whilst the accelerator is partly applied, command the vehicle engine to adopt a different torque map. The consequent change in engine response may be disconcerting to the driver, especially if such automatic mode changes are repeated frequently.

FIG. 1 shows a known motor vehicle 101 having a powertrain 101P. The powertrain 101P includes an engine 121, a transmission 124, a power take-off unit (PTU) 137, a rear driveshaft or propshaft 131R and a front driveshaft or propshaft 131F. The rear driveshaft 131R is operable to drive a pair of rear wheels 113, 114 via a rear differential 135R whilst the front driveshaft 131F is operable to drive a pair of front wheels 111, 112 via a front differential 135F.

The vehicle 101 has an engine controller 121C arranged to receive an accelerator pedal position signal from an accelerator pedal 161 and a brakes controller 141C operable to receive a brake pedal position signal from a brake pedal 163.

In the configuration of FIG. 1 the transmission 124 is releasably connectable to the rear driveshaft 131R by means of the power transfer unit (PTU) 137, allowing selectable two wheel drive or four wheel drive operation.

The PTU 137 is also operable in a 'high ratio' or a 'low ratio' configuration, in which a gear ratio between an input shaft and an output shaft thereof is selected to be a high or low ratio. The high ratio configuration is suitable for general on-road or 'on-highway' operations whilst the low ratio configuration is more suitable for negotiating certain off-road terrain conditions and other low speed applications such as towing.

The vehicle 101 has a central controller 101C, referred to as a vehicle control unit (VCU) 101C. The VCU 101C receives and outputs a plurality of signals to and from various sensors and subsystems provided on the vehicle 101.

The vehicle 101 has a transmission mode selector dial 124S operable to select a required operating mode of the transmission 124. The selector dial 124S provides a control signal to a transmission controller 124C which in turn controls the transmission 124 to operate according to the selected mode. Available modes include a park mode, a reverse mode and a drive mode.

The vehicle 101 also has a terrain response mode selector dial 128S. The terrain response mode selector dial 128S is operable by a driver to select a required terrain response mode of operation of the vehicle.

It is to be understood that if a user selects the drive mode of the transmission 124, the engine controller 121C employs a drive mode throttle map to determine the amount of drive torque that the engine 121 should produce as a function of accelerator pedal position. If the user selects a 'dynamic' TR mode, the engine controller 121C employs a sport mode accelerator (or throttle) pedal progression map instead of the drive mode accelerator pedal progression map. The throttle maps differ in that the sport mode throttle map is arranged to provide a more aggressive response by the engine 121C to a given initial advance (such as depression) of the accelerator pedal 161.

Different throttle maps are also employed for different respective user-selectable terrain response modes.

As noted above, in some arrangements the vehicle may be operable automatically to select an appropriate TR mode for the prevailing driving conditions.

FIG. 2 shows two different accelerator pedal progression maps in the form of a plot of engine torque output T as a function of accelerator pedal position P on a scale from 0 to 100% of full scale depression of the accelerator pedal 161. Two extreme vehicle operating modes A and B are illustrated. Mode A is a cautious torque map and may correspond for example to a TR mode suitable for use when driving over sand. Mode B is a more aggressive torque map and may correspond to a TR mode suitable for use when driving over rock. A driver may select operation according to mode A or mode B my means of the TR mode selector dial 128S. At the zero and 100% accelerator positions, the torque maps coincide, but at part depression of the accelerator pedal significant differences in torque output are apparent.

Thus a switch from mode A to mode B at point C (50% of application of accelerator pedal 161) results in an immediate jump to point D, with consequent increase in engine torque output. The characteristic of line B is subsequently followed. A corresponding switch in the reverse direction results in significant drop in output torque. Changes between torque maps generally comprise movements in the direction of the y axis.

The change in output torque of the engine 121 may take time, and can be deliberately blended, as illustrated in FIG. 3. Thus the increase from point C to point D may be controlled to avoid a step change. For example a maximum blending rate, say 7 Nm/s may be applied, and/or blending may take place at a defined rate within a maximum time period, of say 20 seconds. A small torque change will blend relatively quickly, and a large torque change will take longer.

It will be appreciated that for a given accelerator pedal position a change in torque delivered by the engine 121 will occur as blending progresses from one torque characteristic to another. This change may be disconcerting if the change of operating mode is determined automatically by the VCU 101C rather than the driver. It would be desirable to indicate to the driver that such a change is in progress, but visual or audible indicators are not considered desirable because the driver may be overloaded with information, and not immediately appreciate what the indicator is indicating. Furthermore automatic mode changes may occur frequently, and such indicators may be a distraction.

A mode change may also be disconcerting if occurring automatically during deceleration of a vehicle 101 to a halt. At the next acceleration, the vehicle 101 may respond quite differently to driver expectation of a given movement of the accelerator pedal 161.

What is required is an improved means and method of allowing the vehicle driver to become accustomed to a change of engine torque characteristic.

It is against this background that the present invention has been conceived. Aspects and embodiments of the invention may provide a method, a system or a vehicle which address or obviate the above problems. Other aims and advantages of the invention will become apparent from the following description, claims and drawings.

SUMMARY OF THE INVENTION

According to a first aspect of the invention for which protection is sought there is provided a method of blending between different characteristics of accelerator pedal position and output torque in a vehicle, said method comprising the steps of: detecting a first operating mode of the vehicle, and applying a source characteristic; detecting a second mode of the vehicle, and selecting a target characteristic; and progressively blending said source characteristic to said target characteristic over time, wherein said blending is delayed if the vehicle driver cannot detect that blending is taking place.

Thus in one embodiment, blending is substantially delayed if the difference in torque between said source and target characteristics is too small to be detected by the vehicle driver. It might be expected that blending could take place rapidly under such circumstances because it is not noticeable, but for that reason blending is not desirable because upon movement of the accelerator pedal the progression of the target characteristic may be quite different to the source characteristic.

In particular, blending is substantially suspended whilst the driver cannot detect, by moving the accelerator pedal, that blending is in progress. Whilst the accelerator pedal is not moving, for example, feedback to the driver cannot be made, and accordingly the driver cannot, somewhat subconsciously, be made aware of the changing response of a source of propulsion such as a vehicle engine, an electric motor or any other suitable source.

By 'delayed' is meant that blending is reduced to a low background rate, or is suspended completely so that the overall time for blending is increased. The background rate may be less than half the maximum rate, for example in the range 1-3 Nm/s. A low background rate is desirable to avoid pausing the blend for long periods, for example whilst the vehicle is stationary at traffic lights. Over such a long period, a driver may more easily accept a new response of the source of propulsion to an advance of the accelerator pedal, because a driver's memory of the previous response may diminish with time.

The accelerator pedal position may be substantially unchanging. That is, movement of the accelerator pedal may be relatively low over a given period of time. Thus minimal changes of position, for example movement over less than 5% of full travel, or apparent changes in accelerator pedal position solely due to electrical signal noise or drift, are considered to indicate an unchanging position for purposes of this description. The minimal level of movement or permissible variation of signal may be settable or 'calibrateable'.

Embodiments of the present invention may also be characterized as delaying blending if the difference between the amount of torque developed by a source of propulsion at the instant position of the accelerator pedal and the target torque at that position is below a pre-determined threshold.

In this aspect blending is typically continued at a relatively low rate, for example 3 Nm/s or less, in order to avoid blending quickly between torque characteristics that are close. In this way, relatively large step changes at the maximum blending rate can be avoided, and more time is permitted to allow the vehicle driver to sense that blending is taking place. In some embodiments, the blending rate may be set to substantially zero, i.e. suspended.

The pre-determined threshold may be selected according to the instant position of the accelerator pedal.

Alternatively or in addition the pre-determined threshold may be a percentage of the difference between the source characteristic and the target characteristic. It is to be understood that reference to percentage is directly equivalent to reference to a proportion, in contrast with a fixed absolute value that is not a proportion of another value.

The predetermined threshold may alternatively be an absolute amount. That is, it is not a percentage, but an absolute value such as 5 Nm, 10 Nm, 15 Nm or any other suitable value. In some embodiments the absolute value may be chosen in dependence on one or more other parameters.

In some embodiments of the present invention, blending progresses from one torque characteristic to another mostly whilst the accelerator pedal position is changing. The driver accordingly senses a changing response of the source of propulsion as the accelerator pedal is moving, and can become accustomed to a changed characteristic during blending.

As noted above complete cessation of blending before blending is complete is undesirable, since over a sufficiently long period of time a vehicle driver may not recall the response of a vehicle to a given change of accelerator pedal position. Thus an override may be applied, typically to suspended blending, to ensure that blending is completed within a given maximum time period. This period may be variable, and settable or selectable according to one or more selected from amongst an operating mode of the vehicle, the selected transmission ratio, the difference between source and target maps, and other relevant parameters.

In one embodiment, blending is not suspended, but is reduced to a background rate to ensure that blending is completed within a time period which may for example be in the range 5 to 10 minutes. In alternative embodiments the time period may exceed 10 minutes, and may optionally be in the range 15-20 minutes.

Further alternatively blending may be suspended for a given time period, and then continued at a background rate to the intent that it is completed within such a period referred to above. For example blending may be suspended for 1-10 minutes.

Blending may occur at an unchanging background rate, or at a variable rate dependent for example upon the torque difference or the relative completion of the blend.

The required method of blending, background rate, blending time and other related parameters may be stored in a suitable look-up table by reference to at least the source and target torque maps and accelerator pedal position, or may be the subject of an algorithm held in a controller, such as a powertrain control unit, an engine control unit (ECU), an electric motor control unit or any other suitable control unit.

The characteristic relating accelerator pedal position to output torque may directly indicate the torque output at the flywheel of an internal combustion engine in the case of a vehicle having only an engine as a source of propulsion or a mode in which only an engine provides a source of propulsion, or may represent an analogue thereof, such as one or more of drive torque at the vehicle wheels, power output, another measure of tractive effort, fuel flow, air flow, electric current flow or any measurable indicator that varies according to accelerator pedal progression and torque output. The output torque may represent the output of other forms of motive power, such as an electric motor, or an analogue thereof, such as motor current.

Many suitable analogues are known, so that whilst torque is a convenient direct measure, embodiments of the present invention do not exclude the use of one or more analogues to define the changing pedal progression characteristic.

According to another aspect of the invention for which protection is sought there is provided an electronic control system of a vehicle for blending between different characteristics of accelerator pedal position and output torque by reference to a plurality of torque maps held within a memory, said system being adapted to detect a first operating mode of the vehicle and apply a source map, detect a second operating mode of the vehicle and select a target map, and blend from said source map to said target map over time, the system being further adapted to delay blending if the difference between said maps is below a predetermined threshold.

Aspects of the invention also provide a vehicle incorporating this electronic control system, and a system of changing an operating mode thereof.

Within the scope of this application it is expressly intended that the various aspects, embodiments, examples and alternatives set out in the preceding paragraphs, in the claims and/or in the following description and drawings, and in particular the individual features thereof, may be taken independently or in any combination. For example, features described in connection with one embodiment are applicable to all embodiments unless such features are incompatible.

BRIEF DESCRIPTION OF THE DRAWINGS

Embodiments of the present invention will now be described, by way of example only, with reference to the accompanying drawings in which.

DETAILED DESCRIPTION

Figure 1:
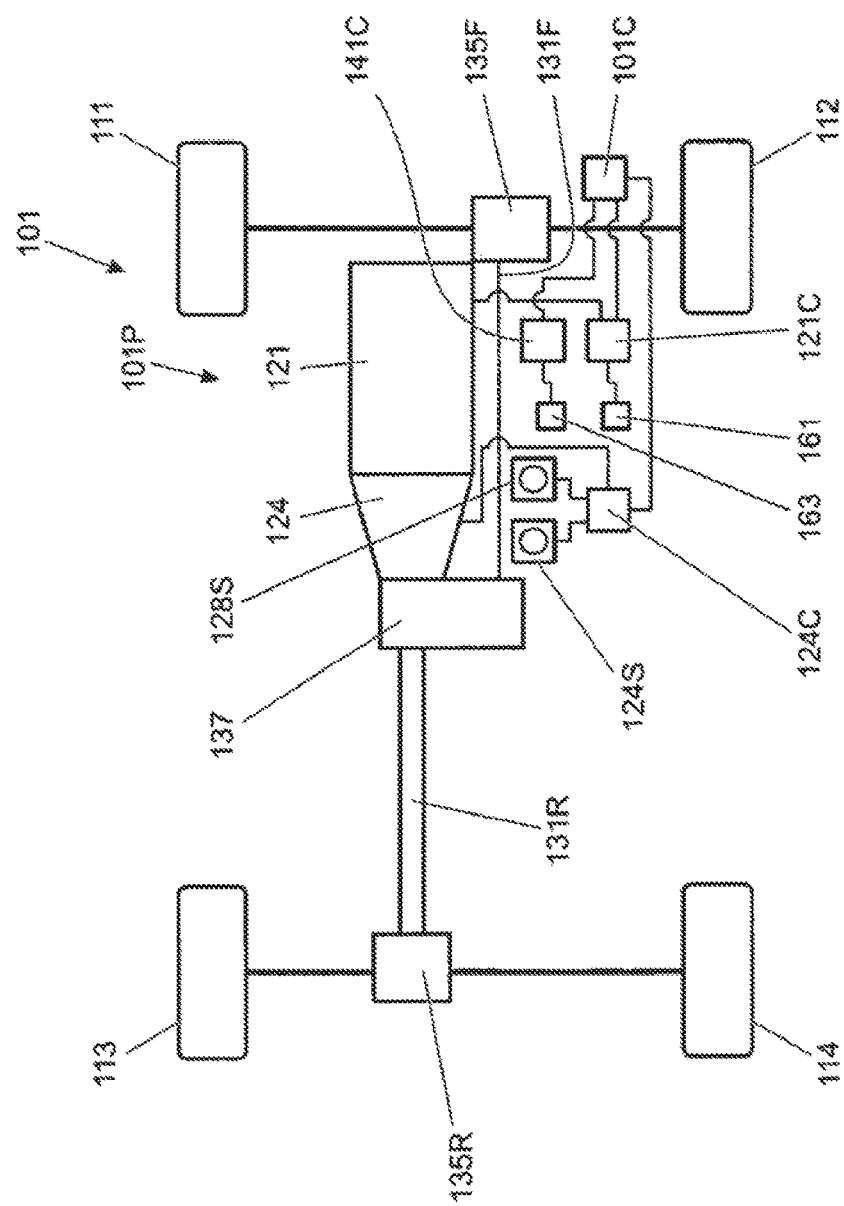
FIG. 1 is a schematic illustration of a known motor vehicle.
Figure 4:
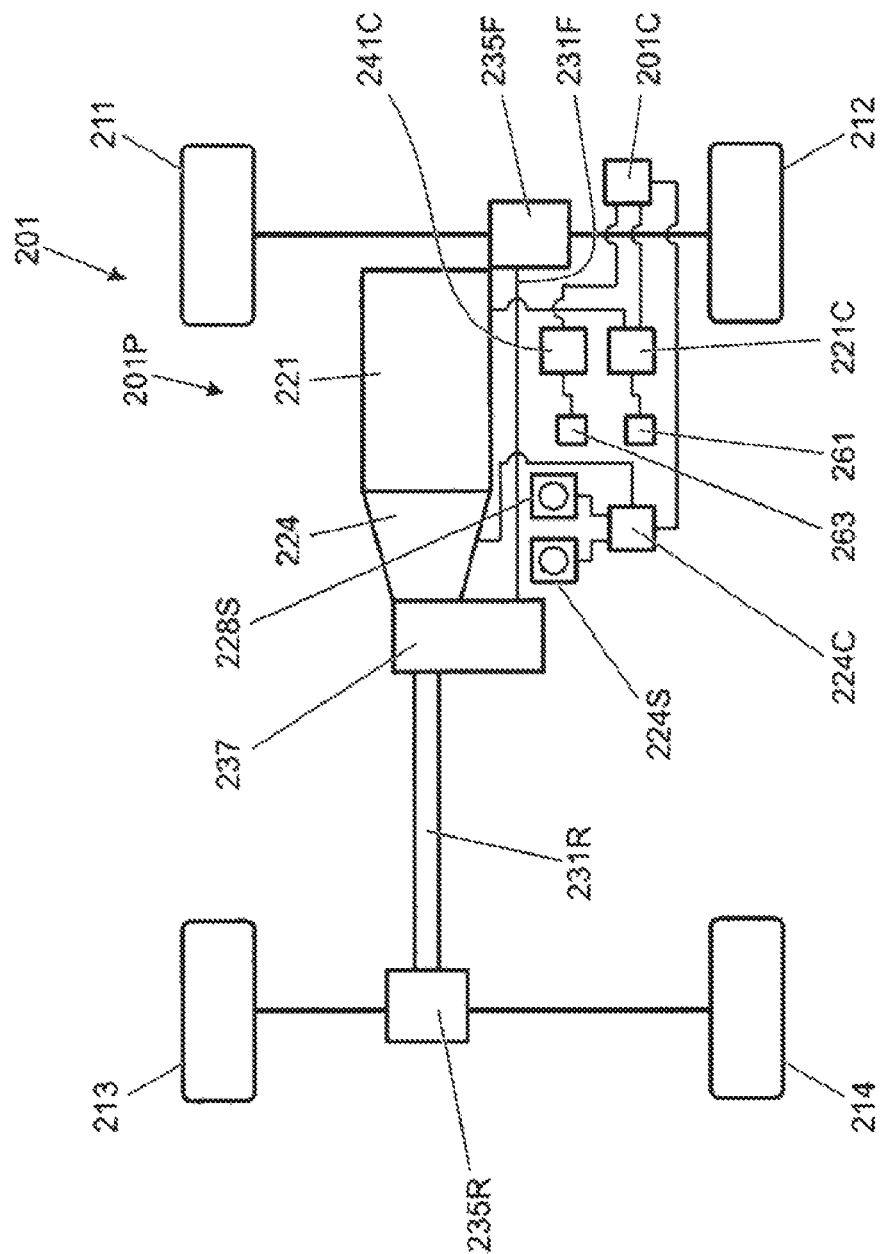
FIG. 4 is a schematic illustration of a motor vehicle according to an embodiment of the present invention.

With reference to the drawings, FIG. 4 is a schematic illustration of a motor vehicle 201 according to an embodiment of the present invention. Like features of the vehicle 201 of FIG. 4 to those of the vehicle 101 of FIG. 1 are shown with like reference numerals prefixed numeral 2 instead of numeral 1. Thus engine 121 of the vehicle 101 of FIG. 1 corresponds to engine 221 of the vehicle 221 of FIG. 4.

The vehicle 201 has a VCU 201C programmed with accelerator pedal progression maps that are used to determine engine torque T as a function of accelerator pedal position P. In the embodiment of FIG. 4 the modes include modes A and B having accelerator pedal progression maps with characteristics A and B, respectively, as described above and illustrated in FIG. 2.

Figure 5:
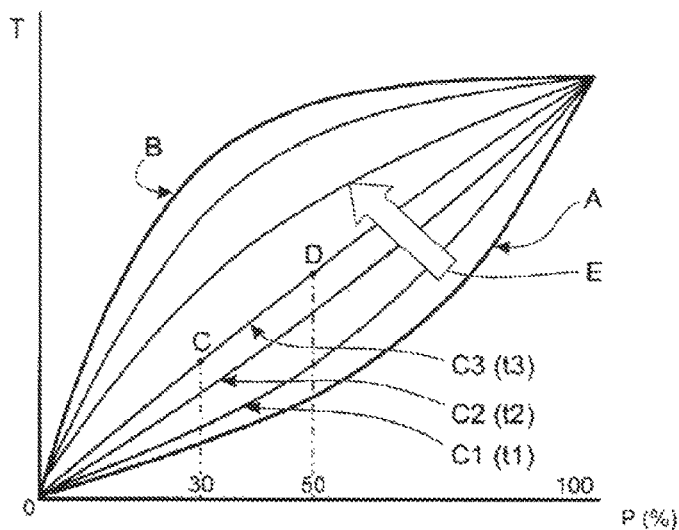
FIG. 5 indicates torque progression during a blend from one operating mode to another.

FIG. 5 illustrates blending of cautious characteristic A of accelerator position P and engine torque T to aggressive characteristic B. As noted above, characteristics A and B represent different vehicle operating modes. The blend progresses generally in the direction of arrow E at a constant rate of 7 Nm/s although other values are also useful. Any advance of accelerator position toward maximum (100%) or release toward minimum (0%) will provide engine torque at the intermediate torque characteristic that has been reached. Three intermediate torque characteristics defined in the blending process are labeled in FIG. 5, being characteristic C1 (assumed at time t1 after blending has commenced), characteristic C2 (assumed at time t2 after blending has commenced) and characteristic C3 (assumed at time t3 after blending has commenced).

Thus for example an advance of accelerator pedal position from 30% to 50% at time t3 after blending has commenced results in a change in torque characteristic from point C to point D, along the intermediate line C3 of FIG. 5.

Figure 2:
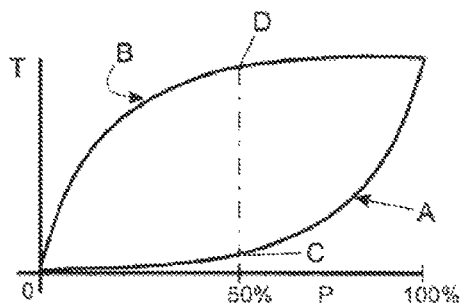
FIGS. 2 and 3 illustrate graphically the blending of engine torque between different vehicle modes.
Figure 3:
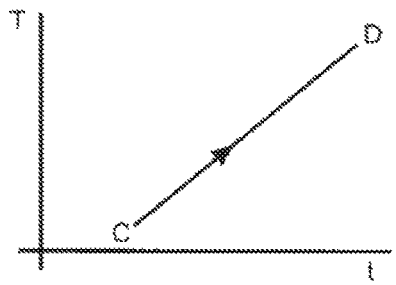

Other kinds of blending may be applied, for example where blending from one torque value to another along the vertical axis of FIG. 2 is conducted at a steady rate so that the shape of the initial characteristic is maintained until the new characteristic is reached. Thus, in blending from characteristic A to characteristic B of FIG. 2, the intermediate characteristics might follow the form of characteristic A over a range of pedal positions above and below which the new characteristic (B) is followed. It is to be understood that at the transition point between characteristics a discontinuity in engine torque T as a function of pedal position P may be experienced. Thus, in the embodiment of FIG. 4 a given change of accelerator pedal position P before blending is complete may result in a change of torque characteristic from that of mode A to that of mode B or from that of mode B to that of mode A between the start and end positions of the accelerator pedal 261. In other words, over part of the range of movement of the accelerator pedal 161 the VCU 201C may follow characteristic A and over another part of the range of movement the VCU 201C may follow characteristic B. In contrast, in the embodiment of FIG. 4 having intermediate characteristics C of the form illustrated in FIG. 5, a relatively smooth transition from one characteristic to another is effected. Other arrangements are also useful.

Some embodiments of the present invention are not limited to a particular form of blending process from one torque characteristic to another save that it should provide a progressive change from one torque characteristic to another. Each such characteristic may represent a vehicle operating mode as discussed above. In some embodiments the torque characteristics represent only different respective operating modes.

According to one embodiment of the invention the blend is delayed in the event that a blend is commanded automatically by the VCU 201C and the accelerator pedal position P is substantially unchanging. Thus, in some embodiments blending is delayed until the accelerator pedal 261 is moved by the driver. The manner in which the delay is implemented under these conditions will be described in more detail below.

It can be seen from FIG. 2 that at accelerator pedal positions of 0% and 100% of travel, all torque characteristics coincide. Between these end positions of the torque characteristics, the torque characteristics diverge between extremes represented in this example by lines A and B.

If the blend is delayed, the instant characteristic is applied to throttle pedal position P, so that for example a paused blend may correspond to characteristic C2 of FIG. 5. In the event the blend has not yet commenced but a delay has been imposed due to lack of movement of the accelerator pedal 261 since a mode change took place, the instant characteristic may correspond to that of the mode in which the vehicle has been operating (the source mode) prior to the command to assume a new mode (the target mode). The instant characteristic applies (i.e. is maintained) until a change in the accelerator pedal position P subsequently exceeds a threshold value, in which case the blend proceeds in the required direction, for example from characteristic A to characteristic B.

The blend may pause several times before a transition between modes is completed, assuming that no further change of vehicle mode is sensed or commanded.

As well as delaying blending due to lack of change of P as a function of time, the VCU 201C may delay the blend if accelerator pedal position P approaches the zero or 100% end position. For example delaying (pausing) of blending may be implemented when the accelerator pedal position P is at less than 10% and more than 90% of pedal travel. Pausing may also be implemented if the difference between the target and source accelerator pedal position characteristics is relatively small, for example less than 5% at any intermediate position of the accelerator pedal 161.

Figure 6:
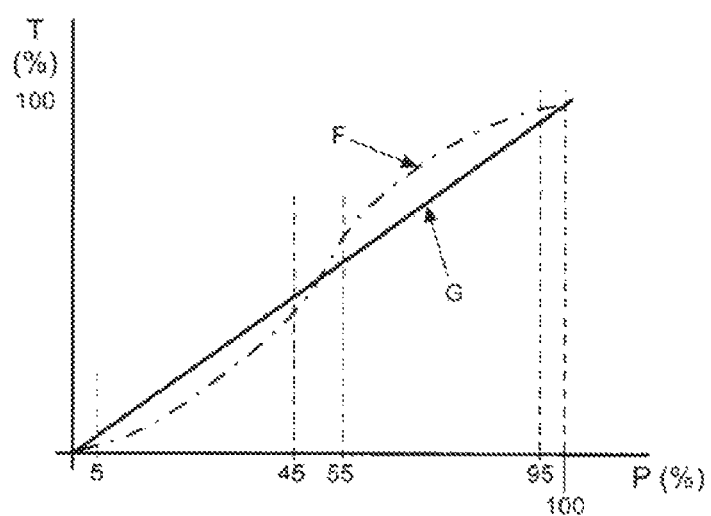
FIG. 6 shows zones of delayed blending where a torque difference is below a threshold.

FIG. 6 illustrates pausing of the blend if the torque difference between the instant torque F and target torque G is small. Accelerator pedal position (P) is plotted against output torque (T). In this case the two pedal progression maps (F, G) are quite similar, and cross over at around the mid-position of the accelerator pedal 161. It is to be understood that, in the embodiment shown, at less than 5% advance of the accelerator pedal 161, between 45 and 55% advance, and above 95% advance, blending is delayed. In this example the instant and target torque separation is about 5% in the delay range, but the limit may be selected according to any desired result so that blending is delayed if the change of map demanded automatically by the VCU 201C has too small a torque difference to be noticed by the vehicle driver.

Thus in practice slight changes of accelerator pedal position P, where the change in the position of the accelerator pedal 161 causes the delay region of the map to be entered, will substantially pause blending substantially at the characteristic that the blend has reached, until such time that the accelerator pedal position P sufficiently departs from the region associated with the pause. For example, with reference to FIG. 5, blending may substantially pause at C2 until the accelerator pedal 161 is moved sufficiently at which time blending will continue to C3 and eventually reach characteristic B. Blending may also be paused in the reverse direction of torque change, for example from operating mode B to operating mode A.

Figure 7:
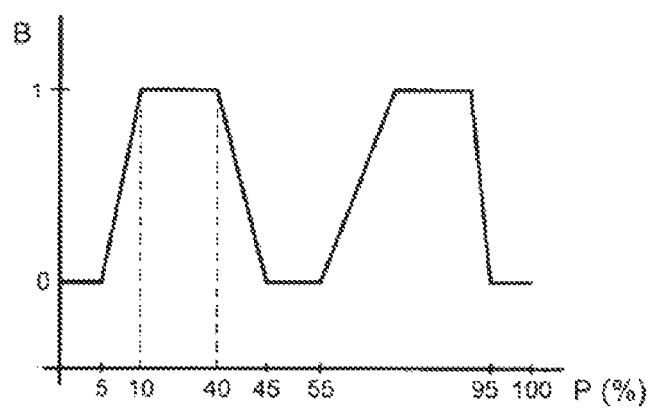
FIG. 7 shows suspension of blending with reference to the characteristics of FIG. 6.

FIG. 7 corresponds to FIG. 6, and shows blending according to the torque maps F, G. Blending (B) is represented by a minimum or suspended rate (state 0) and a maximum rate (state 1).

It can be seen from FIG. 7 that blending (B) is suspended at 0-5% accelerator pedal position because in this instance the torque difference between maps F, G is below a threshold of 5%. If the amount of accelerator pedal depression P is then increased, the blending rate B ramps up to the maximum rate as a function of accelerator pedal position P, by reference to a look-up table. In some alternative embodiments, in addition or instead the blending rate B may ramp up to the maximum rate as a function of time once the pedal position P is not within a range in which blending is suspended. Blending may continue at the maximum rate until suspension is again indicated at accelerator pedal positions P between 45 and 55% of full deflection. The same procedure occurs above 55%, as illustrated.

As the accelerator pedal 261 approaches a region of deflection in which suspension is indicated, the rate of blending may reduce as a function of pedal position P again by reference to a look-up table. In some embodiments, in addition or instead the rate of blending may reduce as a function of time as the accelerator pedal 261 approaches or enters a region in which suspension is indicated. The rate at which blending is introduced and withdrawn may be variable in some embodiments. This is indicated by the slopes of the blending rate characteristic between state 0 and state 1 shown in FIG. 7. The blending rate as a function of accelerator pedal position P when blending is being introduced or withdrawn is determined according to the instant difference between the respective torque maps in the embodiment illustrated in FIG. 7 although other arrangements are also useful. In the embodiment of FIG. 7 this rate is, for simplicity, illustrated as a straight line (constant rate of increase or decrease). Thus the rate of introduction and withdrawal may be proportional to the difference between the source and target maps. However, the rate of introduction or withdrawal of blending as a function of pedal position P can follow any other suitable desirable shape and provide, for example, an exponential rate of increase or decrease. Other arrangements are also useful.

Embodiments of the present invention have the advantage that a driver will not be surprised by a change in accelerator pedal position/engine torque output characteristic of a vehicle 201 following a mode change implemented automatically by the VCU 201C (as opposed to a change implemented in response to a user command to change mode). This is because, according to some embodiments of the invention, under conditions in which a driver does not change the accelerator pedal position P and/or in which the difference in output torque between the source and target modes is less than a prescribed value, the blending rate is reduced (and in some embodiments blending is substantially suspended or stopped). Blending may be substantially stopped, or the rate of blending reduced to a sufficiently low value, until one or more prescribed conditions are met. The rate of blending when blending is reduced may be determined as a value that is sufficiently low that a driver will not be surprised by a change of accelerator pedal progression characteristic (due to the continuation of blending) when the driver next moves the accelerator pedal. An accelerator pedal may remain in a condition of substantially zero advancement with a driver's foot removed from the pedal for a not insignificant period of time under certain circumstances, for example when a vehicle is stopped at traffic lights, or a driver has paused to view scenery or wildlife. Accordingly, a driver's mental memory of the accelerator pedal progression map will fade with time, and the driver will not be surprised by a change in pedal progression map when the driver subsequently depresses the accelerator pedal.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A method of blending between different characteristics of accelerator pedal position and output torque in a vehicle, the method comprising:
    detecting a first operating mode of the vehicle, and applying a source torque value associated with the first operating mode and an instant position of the accelerator pedal;
    changing to a second operating mode of the vehicle, and selecting a target torque value associated with the second operating mode and the instant position of the accelerator pedal;
    progressively blending, by an electronic control system of the vehicle, the first operating mode source torque value to the second operating mode target torque value over time;
    controlling a source of propulsion of the vehicle to produce the selected or blended torque value; and
    wherein the blending is delayed if the difference between the source torque value and the target torque value at the instant position of the accelerator pedal is below a pre-determined threshold.

2. The method according to claim 1, wherein the blending is delayed by gradual commencement or gradual termination thereof.

3. The method according to claim 1, wherein blending is delayed by suspension thereof.

4. The method according to claim 1, comprising completing blending from the source torque value to the target torque value within a predetermined period.

5. The method according to claim 1, comprising detecting a change to the second operating mode.

6. The method according to claim 1, wherein the first operating mode source torque value is stored in a source torque map associated with the first operating mode, and the second operating mode target torque value is stored in a target torque map associated with the second operating mode.

7. A method of blending between different characteristics of accelerator pedal position and output torque in a vehicle, the method comprising:
    detecting a first operating mode of the vehicle, and applying a source torque value associated with the first operating mode and an instant position of the accelerator pedal;
    changing to a second mode of the vehicle and selecting a target torque value associated with the second operating mode and the instant position of the accelerator pedal;
    progressively blending, by an electronic control system of the vehicle, the first operating mode source torque value to the second operating mode target torque value over time;
    controlling a source of propulsion of the vehicle to produce the selected or blended torque value; and
    wherein the blending is delayed if the position of the accelerator pedal is substantially unchanging.

8. The method according to claim 7, comprising completing blending from the source torque value to the target torque value within a predetermined period.

9. The method according to claim 7, comprising detecting a change to the second operating mode.

10. An electronic control system of a vehicle for blending between different characteristics of accelerator pedal position and output torque by reference to a plurality of torque values held within a memory, the system being configured to:
  detect a first operating mode of the vehicle and apply a source torque value associated with the first operating mode and an instant position of the accelerator pedal;
  detect a change in the operating mode of the vehicle from the first operating mode to a second operating mode and select a target torque value associated with the second operating mode and the instant position of the accelerator pedal; and
  blend from the first operating mode source torque value to the second operating mode target torque value over time, the system being further configured to delay blending if a difference between the first and second torque values is below a predetermined threshold; and
  control a source of propulsion of the vehicle to produce the selected or blended torque value.

11. The system according to claim 10, further configured to delay blending by gradual commencement or gradual termination thereof.

12. The system according to claim 10, further configured to delay blending by suspension thereof.

13. The system according to claim 10, further configured to complete blending within a predetermined period.

14. The system according to claim 10, wherein the first operating mode source torque value comprises a source torque map associated with the first operating mode, and the second operating mode target torque value comprises a target torque map associated with the second operating mode.

15. A vehicle comprising the electronic control system according to claim 10, and a system for automatically changing the operating mode of the vehicle according to different conditions of use, whereby one of the plurality of torque values is selected for each operating mode.

16. An electronic control system of a vehicle for blending between different characteristics of accelerator pedal position and output torque by reference to a plurality of torque values within a memory, the system being configured to:
  detect a first operating mode of the vehicle and apply a source torque value associated with the first operating mode and an instant position of the accelerator pedal;
  detect a change in the operating mode of the vehicle from the first operating mode to a second operating mode of the vehicle and select a target torque values associated with the second operating mode and the instant position of the accelerator pedal;
  blend from the first operating mode source torque value to the second operating mode target torque value over time, the system being further adapted to delay blending if the position of the accelerator pedal is substantially unchanging; and
  control a source of propulsion of the vehicle to produce the selected or blended torque value.

17. The system according to claim 16, further configured to complete blending within a predetermined period.

18. A vehicle comprising the electronic control system according to claim 16, and a system for automatically changing the operating mode of the vehicle according to different conditions of use, whereby one of the plurality of torque values is selected for each operating mode.

* * * * *